United States Patent
Yunoki

(10) Patent No.: US 12,101,677 B2
(45) Date of Patent: Sep. 24, 2024

(54) NETWORK APPLICATION ORCHESTRATION SYSTEM

(71) Applicant: Hitachi, Ltd., Tokyo (JP)

(72) Inventor: Shoji Yunoki, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 386 days.

(21) Appl. No.: 17/584,896

(22) Filed: Jan. 26, 2022

(65) Prior Publication Data

US 2023/0239759 A1    Jul. 27, 2023

(51) Int. Cl.
| | |
|---|---|
| H04W 36/22 | (2009.01) |
| H04W 4/50 | (2018.01) |
| H04W 24/08 | (2009.01) |
| H04W 36/14 | (2009.01) |

(52) U.S. Cl.
CPC .......... *H04W 36/22* (2013.01); *H04W 4/50* (2018.02); *H04W 24/08* (2013.01); *H04W 36/14* (2013.01)

(58) Field of Classification Search
CPC ........ H04L 67/12; H04L 67/30; H04W 36/22; H04W 24/08; H04W 36/14; H04W 4/50
USPC ........................................ 455/414.1; 370/235
See application file for complete search history.

(56) References Cited

U.S. PATENT DOCUMENTS

| | | | |
|---|---|---|---|
| 9,374,310 B2 * | 6/2016 | Natarajan | H04L 12/4641 |
| 9,392,050 B2 | 7/2016 | Voit et al. | |
| 10,404,788 B2 * | 9/2019 | Cheng | H04L 67/1001 |
| 10,715,633 B2 * | 7/2020 | Mukund | H04L 67/12 |
| 11,159,544 B2 * | 10/2021 | Mayes | H04L 63/1408 |
| 11,533,295 B2 * | 12/2022 | Shulman | H04L 63/1491 |
| 11,711,759 B1 * | 7/2023 | Gupta | H04L 45/64 370/235 |
| 2016/0352735 A1 * | 12/2016 | Zou | H04L 61/2514 |
| 2018/0007123 A1 * | 1/2018 | Cheng | H04L 12/4641 |
| 2020/0236118 A1 * | 7/2020 | Mayes | H04L 63/1433 |

(Continued)

OTHER PUBLICATIONS

K. Onoue and N. Matsuoka, "Traffic-Aware Resource Controller for IaaS Clouds," 2015 IEEE 7th International Conference on Cloud Computing Technology and Science (CloudCom), Vancouver, BC, Canada, 2015, pp. 91-98, doi: 10.1109/CloudCom.2015.47. (Year: 2015).*

(Continued)

*Primary Examiner* — William D Cumming
(74) *Attorney, Agent, or Firm* — PROCOPIO, CORY, HARGREAVES & SAVITCH LLP

(57) ABSTRACT

Systems and methods for managing communications between edge devices and cloud devices over a first network (e.g., a private network such as a private 5G network) and a second network (e.g., a public network such as a public 5G network), involving monitoring an amount of traffic data in the first network. When the amount of traffic data exceeds a predetermined value, systems and methods further involve selecting one or more applications executing in a device of the first network; migrating the selected one or more applications from the first network to the second network; and changing a destination address of data communications associated with the selected one or more applications from the device in the first network to another device in the second network; wherein the selecting the one or more applications is conducted based on compute resources required for executing each one or more applications per traffic data.

13 Claims, 9 Drawing Sheets

(56) References Cited

U.S. PATENT DOCUMENTS

| | | | |
|---|---|---|---|
| 2021/0337452 A1 | 10/2021 | Furuichi et al. | |
| 2023/0239759 A1* | 7/2023 | Yunoki | H04L 67/30 |
| | | | 455/414.1 |
| 2023/0281527 A1* | 9/2023 | Cella | G06V 20/17 |
| | | | 705/7.17 |
| 2023/0396634 A1* | 12/2023 | Fang | H04L 67/75 |
| 2024/0048485 A1* | 2/2024 | Janakiraman | H04L 45/42 |

OTHER PUBLICATIONS

Japanese Office Action dated Dec. 12, 2023, in counterpart Japanese Application No. 2022-208521.
Abe, et al., "How 5G Works," 2020, 10 pages.

\* cited by examiner

| MEC type | IP address |
|---|---|
| Private MEC | 192.168.1.101 |
| Public MEC | 192.1.1.101 |

401 — MEC type
402 — IP address

FIG. 4

| Client device ID | App name | Communication Resource [Mbps] | MEC computing resource [CPU cores] | MEC computing resource per Mbps |
|---|---|---|---|---|
| 1 | A | 50 | 20 | 0.4 |
| 2 | B | 50 | 16 | 0.32 |
| 3 | C | 50 | 14 | 0.28 |
| 4 | D | 50 | 12 | 0.24 |
| 5 | E | 50 | 10 | 0.2 |
| 6 | F | 50 | 8 | 0.16 |
| 7 | G | 30 | 6 | 0.2 |
| 8 | H | 30 | 4 | 0.13 |
| 9 | K | 20 | 4 | 0.2 |
| 10 | L | 20 | 2 | 0.1 |

FIG. 6

| Client device ID 601 | App name 602 | State of application 801 | 5G Communication Resource [Mbps] 603 | 5G MEC computing resource [CPU cores] 604 | 5G MEC computing resource per Mbps 605 |
|---|---|---|---|---|---|
| 1 | A | Not transferrable | 50 | 20 | 0.4 |
| 2 | B | Not transferrable | 50 | 16 | 0.32 |
| 3 | C | transferrable | 50 | 14 | 0.28 |
| 4 | D | transferrable | 50 | 12 | 0.24 |
| 5 | E | Not transferrable | 50 | 10 | 0.2 |
| 6 | F | transferrable | 50 | 8 | 0.16 |
| 7 | G | Not transferrable | 30 | 6 | 0.2 |
| 8 | H | Not transferrable | 30 | 4 | 0.13 |
| 9 | K | transferrable | 20 | 4 | 0.2 |
| 10 | L | Not transferrable | 20 | 2 | 0.1 |

FIG. 8

NETWORK APPLICATION ORCHESTRATION SYSTEM

BACKGROUND

Field

The present disclosure is generally related to network applications, and more specifically, to network application orchestration systems for private and public networks.

Related Art

Recently, a large variety of options of communication system and computing systems have been available for IoT (Internet of Things) system. For example, cellular or other networks such as 5G provide low latency, high capacity, high reliability for IoT systems. Moreover, two types of networks are available, one is public and the other is private. For example, in the 5G network system, public 5G is a general cellular network which is provided by a telecom company and shared with an unlimited number of users. Public 5G is a shared network, so its performance is relatively low compared with private 5G performance. Private 5G is a dedicated cellular network which can be installed and operated by non-telecom companies. For example, a manufacturing company can install its own private 5G in its manufacturing plant. Private 5G is a dedicated network, so the owner of the network can manage its performance, which leads to higher performance.

As for the computing system, cloud computing environments as well as traditional on-premise computing environment have been available in the related art. The cost involved in on-premise computing is relatively low in the long run and the performance provided by on-premise computing is relatively high because on-premise computing resources are installed close to its users. On the other hand, the cost involved in cloud computing is relatively high and performance of it is relatively low compared to on-premise computing. However, charge for the use of cloud computing is pay-per-use and the time needed to prepare cloud computing is very short. Therefore, cloud computing is essential for temporary or urgent use. Given these multiple communication and computing options, it is important to select the optimal combination based on the requirements of the IoT application that uses them.

SUMMARY

The cost involved in the use of communication system and computing resource varies depending on which communication system and computing system is used. Therefore, the cost can be very high if cost side is not considered when additional communication and computing is prepared.

Example implementations described herein involve a method to prepare communication and computing resource at lower cost with avoiding resource shortages. In the present disclosure, when some applications need to be migrated to cloud computing environment due to shortage of on-premise communication resource, the orchestrator selects applications to be migrated based on their value of computer resources per data traffic. Applications with lower values of computing resources per data traffic are selected first to be migrated to cloud computing environment.

Aspects of the present disclosure involve a method for managing communications between edge devices and cloud devices over a first network and a second network, involving monitoring an amount of traffic data in the first network; when the amount of traffic data exceeds a predetermined value, selecting one or more applications executing in a device of the first network; migrating the selected one or more applications from the first network to the second network; changing a destination address of data communications associated with the selected one or more applications from the device in the first network to another device in the second network; wherein the selecting the one or more applications is conducted based on compute resources required for executing each one or more applications per traffic data.

Aspects of the present disclosure involve a computer program storing instructions for managing communications between edge devices and cloud devices over a first network and a second network, the instructions involving monitoring an amount of traffic data in the first network; when the amount of traffic data exceeds a predetermined value, selecting one or more applications executing in a device of the first network; migrating the selected one or more applications from the first network to the second network; changing a destination address of data communications associated with the selected one or more applications from the device in the first network to another device in the second network; wherein the selecting the one or more applications is conducted based on compute resources required for executing each one or more applications per traffic data. The computer program and instructions can be stored on a non-transitory computer readable medium and executed by one or more processors.

Aspects of the present disclosure involve a system for managing communications between edge devices and cloud devices over a first network and a second network, involving means for monitoring an amount of traffic data in the first network; when the amount of traffic data exceeds a predetermined value, means for selecting one or more applications executing in a device of the first network; means for migrating the selected one or more applications from the first network to the second network; means for changing a destination address of data communications associated with the selected one or more applications from the device in the first network to another device in the second network; wherein the selecting the one or more applications is conducted based on compute resources required for executing each one or more applications per traffic data.

Aspects of the present disclosure involve an apparatus for managing communications between edge devices and cloud devices over a first network and a second network, involving a processor, configured to execute instructions involving monitoring an amount of traffic data in the first network; when the amount of traffic data exceeds a predetermined value, selecting one or more applications executing in a device of the first network; migrating the selected one or more applications from the first network to the second network; changing a destination address of data communications associated with the selected one or more applications from the device in the first network to another device in the second network; wherein the selecting the one or more applications is conducted based on compute resources required for executing each one or more applications per traffic data.

BRIEF DESCRIPTION OF DRAWINGS

FIG. 4 is an illustration of application profiles, in accordance with an example implementation.

FIG. 6 is an illustration of a resource utilization table, in accordance with an example implementation.

FIG. 8 is an illustration of the resource utilization table, in accordance with an example implementation.

DETAILED DESCRIPTION

Figure 1:
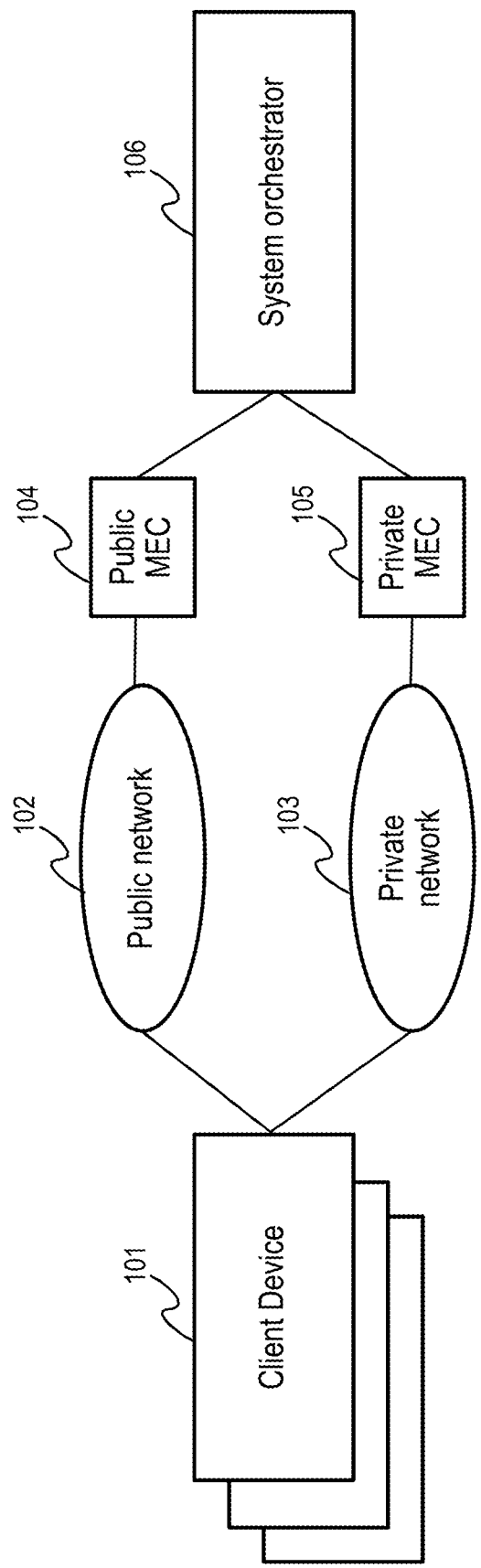
FIG. 1 illustrates a system architecture to which example implementations may be applied.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve a first network and second network which facilitate communications between edge devices and cloud devices. In the example implementations described herein, the systems and methods monitor the amount of traffic in the first network, and when the amount of data exceeds the predetermined value, proceeds to select one or more of the applications activated in the device in the first network, migrate the selected application from the first network to the second network, and change the destination address of the data communication regarding the selected application from the device in the first network to the device in the second network The selection of the application is done based on the required computer resources per data traffic. (e.g., selecting the application requiring fewer resources such as compute resources).

FIG. 1 illustrates a system architecture to which example implementations may be applied. The system can involve client devices 101, a public network 102, a private network 103, a public MEC 104, a private MEC 105 and a system orchestrator 106. The MEC (Mobile Edge Computing) is a server which is directly connected to a cellular network, so a cellular user can access to the MEC with shorter delay. The client devices 101 connect to the public MEC 104 via public network 102 and connect to private MEC 105 via the private network 103. The client devices 101 run applications in collaboration with the MECs via the public or private network. System orchestrator 106 monitors the utilization of the private network 103 and orchestrates connectivity of the client devices 101 and execution of applications according to the currently used amount of traffic in the private network 103. It is assumed that the private network 103 and private MEC 105 are owned by its users, so the users do not have to pay the fee for the use of the private network 103 or the private MEC 105. On the other hand, it is assumed that public network 102 is owned by a telecom/utility company and the public MEC 104 is owned by a cloud servicer, so the users pay fee for the use of the public network 102 and the public MEC 104 by pay-per-use. Therefore, the use of the private network 105 and the private MEC 105 is prioritized to reduce the cost involved in the use of communication and computing as long as their resource is available.

In the example implementations described herein, the private network is a dedicated network for either using dedicated resources for important analytics (e.g., in an IoT system, some processes/assets may need further scrutiny so they are moved to the private network) or for ensuring that the data and analytics transmitted are kept private. In such implementations, the amount of traffic data in the private network can exceed a preset threshold due to many reasons, such as, but not limited to, a firmware update, an incident that occurs that requires more details from a private entity, and so on. Example implementations described herein are directed to prioritizing such private network resources and migrating private network applications to the public network as needed. The example implementations can be extended to any private/public network system, such as, but not limited to, cloud/edge devices, IoT, smart manufacturing systems, sensor systems involving remote sensors, and so on in accordance with the desired implementation.

In example implementations described herein, the private network and/or the public network can be a 5G network, and the system orchestrator can be a 5G system orchestrator to facilitate implementations involving 5G networks, but the present disclosure is not limited thereto. Other types of cellular networks can take advantage of the public/private networks and protocols as disclosed in the present disclosure, and the example implementations described herein can be applied as such to fit the desired implementation.

Figure 2:
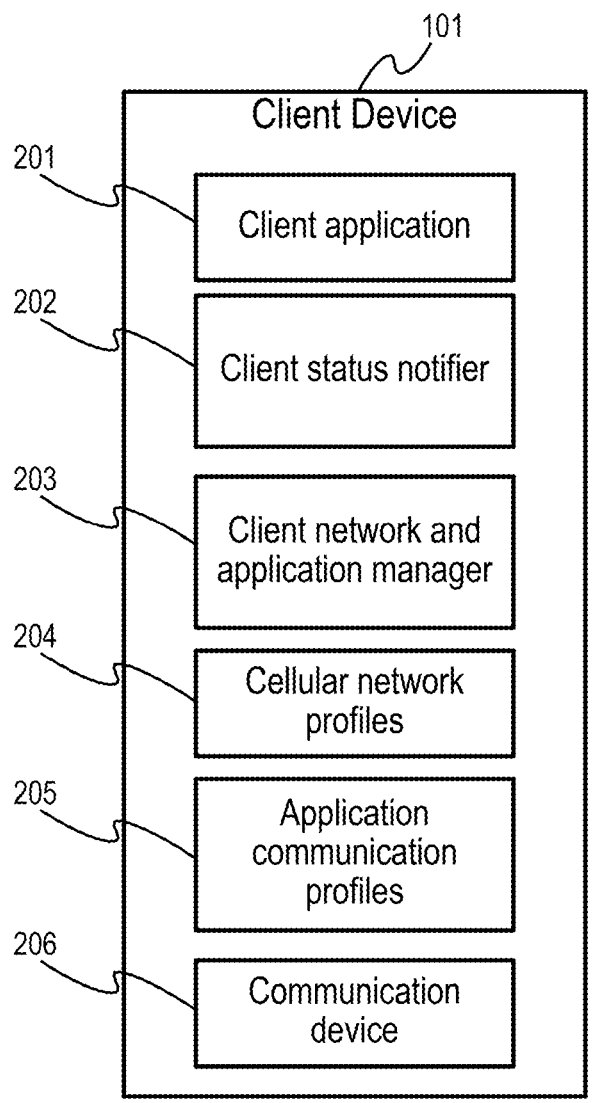
FIG. 2 is an illustration of functional block diagram of client device, in accordance with an example implementation.

FIG. 2 illustrates a functional diagram of a client device 101, in accordance with an example implementation. The client device 101 involves a client application 201, a client status notifier 202, a client network and application manager 203, cellular network profiles 204, application communication profiles 205 and a 5G device 206. The client application 201 runs in collaboration with a server application running in the MECs. Typically, the client application 201 conducts only light computing with limited resources and the server application conducts heavy computing with abundant computing resources. The client status notifier notifies the system orchestrator 106 of the required communication resource between the client application 201 and the server application. The client status notifier 202 also notifies the system orchestrator 106 of the required computing resource in the MEC for the execution of the server application. The client network and application manager 203 changes the configurations for applications referring to the cellular network profiles 204 and application communication profiles 205 when it receives a command from the system orchestrator 106. The cellular network profiles involve configurations for the communication device 206 to connect to different cellular networks. The application communication profiles 205 involve configurations for client applications to connect to server applications. The communication device 206 is a communication device which is used to connect to a cellular network based on a selected profile. Such a communication device 206 can be a 5G device configured to connect to a 5G network, but is not limited thereto.

Figure 3:
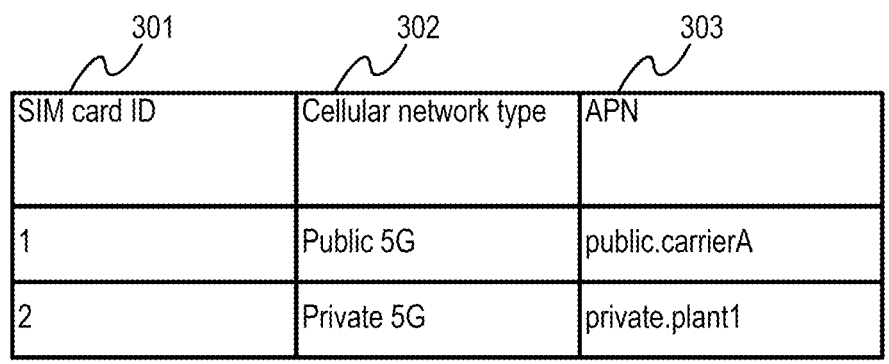
FIG. 3 is an illustration of communication profiles, in accordance with an example implementation.

FIG. 3 illustrates cellular network profiles 204, in accordance with an example implementation. The cellular network profiles 204 involves a SIM card ID (identifier) 301, a cellular network type 302 and an APN (Access Point Name) 303. The SIM card ID 301 is used for the client device 101 to identify each SIM card. The cellular network type 302 is ether public network (e.g., public 5G) or private network (e.g., private 5G). The APN 303 is used for the client device to establish a path to the cellular network.

FIG. 4 illustrates an example of application communication profiles 205, in accordance with an example implementation. The application profiles 205 involve a MEC type 401 and an IP (internet protocol) address 402. MEC type 401 indicates the type of MEC where server applications run. The IP address 402 indicates the IP address used by the server application.

Next, a concrete process of the client network and application manager 203 is explained below. It is assumed that a client device 101 has cellular network profiles 204 as shown in FIG. 3, application communication profiles 205 as shown in FIG. 4, and application A running in collaboration with the private MEC 105 via the private network 103. It is also assumed that the client device 101 receives a command to switch its communication path to the public MEC 104 via the public network 102. In this case, the client device 101 refers to the cellular network profiles 204 and applies SIM card 1 and APN: public. carrier A which are associated with public network 102 to the communication device 206. Then, the client device 101 changes the client application's destination IP address to 192.1.1.101.

Figure 5:
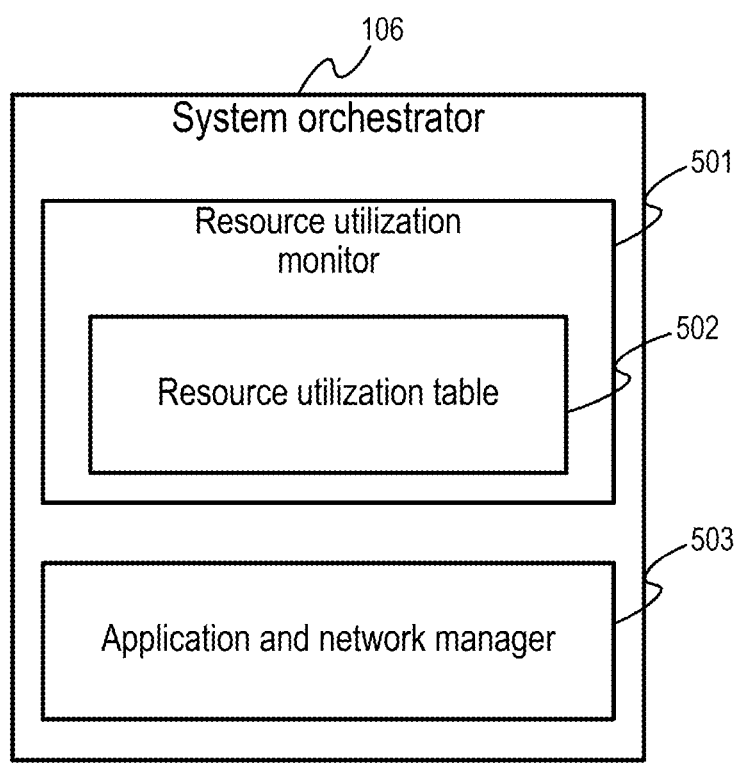
FIG. 5 is an illustration of a system orchestrator, in accordance with an example implementation.

FIG. 5 illustrates a functional diagram of the system orchestrator 106, in accordance with an example implementation. The system orchestrator 106 involves a resource utilization monitor 501 and an application and network manager 503. The resource utilization monitor 501 involves a resource utilization table 502. The resource utilization monitor 501 receives from client devices 101 notifications about the communication resource and the computing resource involved in the execution of applications in the private MEC 105 via the private network 103. The resource monitor updates the resource utilization table 502 based on the received notification.

FIG. 6 illustrates an example of a resource utilization table 502, in accordance with an example implementation. The resource utilization table 502 involves a client device ID 601, Application name 602, communication resource [Mbps or Megabits per second] 603 such as 5G communication resources, MEC computing resource [CPU cores] 604 such as 5G MEC computing resources, and MEC computing resource per Mbps 605, such as 5G MEC computing resources per Mbps. The communication resource 603 indicates the amount of communication resource used by the corresponding application. The MEC computing resource 604 indicates the computing resource used by the corresponding application. For example, when the system orchestrator receives from the client device #9 a notification that the application K is running, the used communication resource between the client device 101 and the private MEC 105 for application K is 20 [Mbps], computing resource used in the private MEC 105 for application K is 4, the row is added to the table as shown at 606. The MEC computing resource per Mbps 605 is calculated by dividing MEC computing resource by the 5G communication resource.

The application and network manager 503 migrates applications running in the private MEC 105 to the public MEC 104 when it detects the traffic amount of the private network. 105 exceeding the predetermined value V. When the application and network manager 503 selects the applications to be migrated, it selects the application which has the lowest value of the MEC computing resource per Mbps. The cost for the use of the public MEC' 104 is calculated by pay-per-use, so selecting the application to be migrated which has the lowest value of the MEC computing resource per Mbps contributes to reducing the cost for the use of the public MEC 104. The application and network manager 503 migrates applications running in the public MEC 104 to the private MEC 105 when it detects that the private MEC 105 has enough communication resource for applications to be migrated from the public MEC 104. When the application and network manager 503 selects an application to be migrated, it selects the application which has the highest value of the 5G MEC computing resource per Mbps among the applications whose required computing resource is less than or equal to the margin calculated by the predetermined threshold V—the current traffic amount in the private network. As mentioned above, the cost for the use of the public MEC 104 is calculated by pay-per-use, so selecting the application running in the public MEC to be migrated to the private MEC which has the highest value of MEC computing resource per Mbps contributes to reducing the cost for the use of the public MEC 104.

Figure 7:
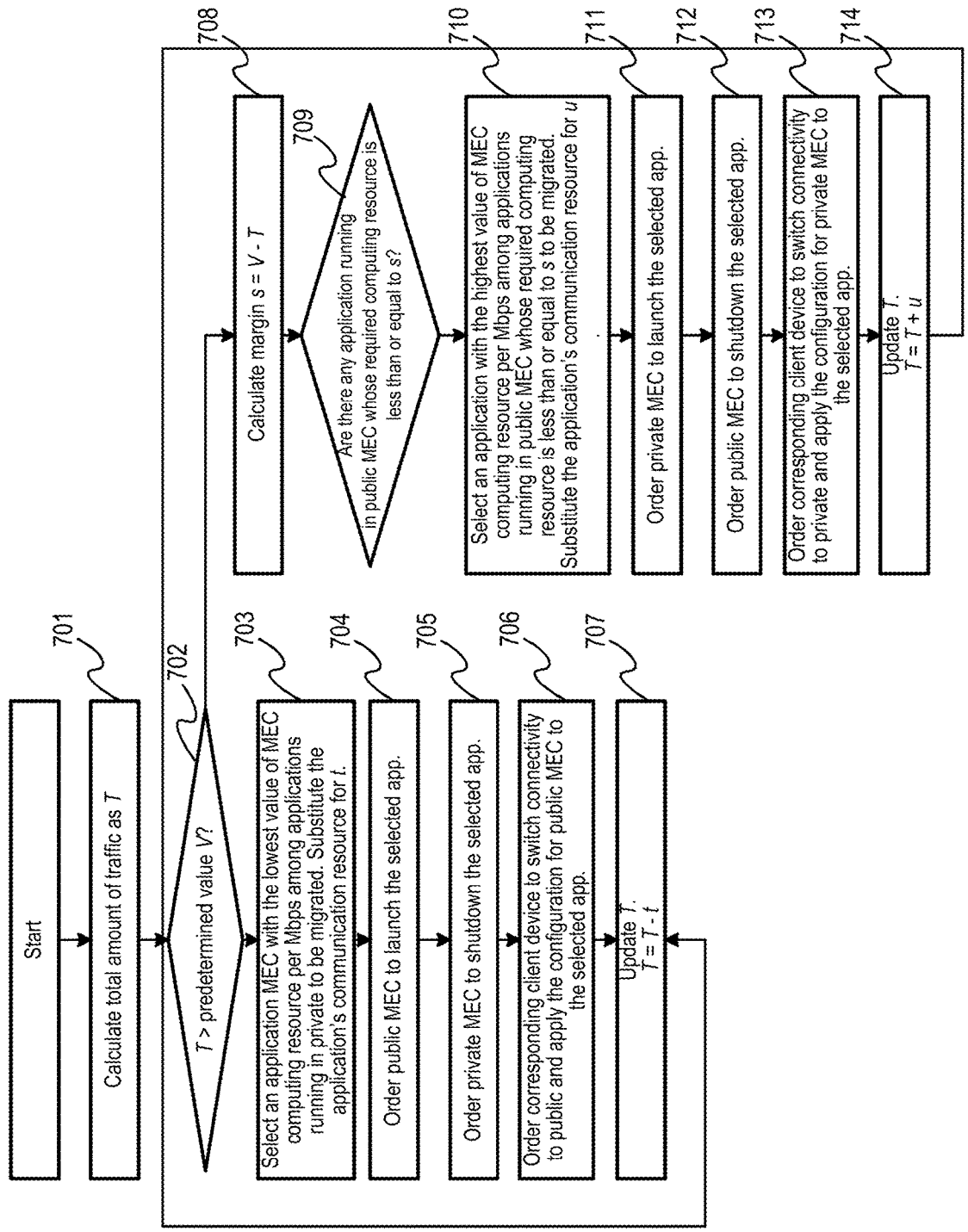
FIG. 7 is an illustration of flowchart of application and network manager, in accordance with an example implementation.

FIG. 7 illustrates an example of flowchart of the application and network manager. In step 701, the application and network manager 503 calculates the total amount of traffic in the private network as T and proceeds to 702. In step 702, the application and network manager 503 checks if T is larger than predetermined value V. If the output of 702 is Yes, it proceeds to step 703. If the output of 702 is No, it proceeds to 708.

In step 703, the application and network manager 503 selects an application with the lowest value of MEC computing resource per Mbps among applications running in private MEC to be migrated, sets the selected application's 5G communication resource for t, and proceeds to step 704. In step 704, the application and network manager 503 instructs the public MEC 104 to launch the selected application and proceeds to 705. In step 705, the application and network manager 503 orders private MEC to shut down the selected application and proceeds to 706. In step 706, the application and network manager 503 orders the corresponding client device to switch connectivity to public 5G 104 and apply the configuration for pubic MEC 104 to the selected application and proceeds to 707. In step 707, the application and network manager updates T by the formula (T=T−t) and proceeds to 701. In step 708, the application and network manager 503 calculates margin s by the formula s=V−T and proceeds to step 709. In step 709 the application and network manager 503 checks if there is any application running in public MEC whose required computing resource is less than or equal to s. If the output of step 709 is yes, it proceeds to step 710. If the output of step 709 is no, it proceeds to step 702.

In step 710, the application and network manger 503 selects an application with the highest value of MEC computing resource per Mbps among applications running in public MEC to be migrated and sets substitutes for the application's communication resource for u, and then proceeds to step 711. In step 711, the application and network manager 503 instructs the private MEC 104 to launch the selected application and proceeds to 712. In step 712, the application and network manager 503 instructs the public MEC to shut down the selected application and proceeds to 713. In step 713, the application and network manager 503 orders the corresponding client device to switch connectivity to private 5G 104 and apply the configuration for private MEC 104 to the selected application and proceeds to 714. In step 714, the application and network manager updates T by the formula (T=T+u) and proceeds to 702.

A concrete flow of the application and network manager 503 is explained below with the flowchart shown in FIG. 7 and the table shown in FIG. 6. Here, it is assumed that the predetermined value V as threshold for the traffic amount in the private 5G network 103 is 350 [Mbps]. In step 701, the calculated total amount of the traffic in the private 5G network 103 as T is 400 [Mbps] (>350 [Mbps]) and it proceeds to 702. In step 702, T=400 and V=350, so the output is Yes and the application and network manager 503 proceeds to 703. In 703, application L running on the client device #10 is selected to be migrated to the public 5G network 102 because it has the lowest value 0.1 of the 5G MEC computing resource per Mbps. The application and network manager 503 substitutes 20 [Mbps] for/(the application's 5G communication resource). In step 704, the application and network manager 503 orders public MEC to launch application L and proceeds to 705. In step 705, the application and network manager 503 orders the private MEC to shut down application L and proceeds to 706. In step 706, the application and network manager 503 orders the client device #10 to switch its connectivity to public 5G and to apply the configuration for public MEC to the application L and it proceeds to 707. In step 707, the application and network manager updates T to 380 (=400−20) and proceeds to 702. In step 702, T=380 and I'=350, so the output is Yes. Then the application and network manager 503 proceeds to 703.

In step 703, application H running on the client device #8 is selected to be migrated to the public 5G because it has the lowest value 0.13 of the 5G MEC computing resource per Mbps. The application and network manager 503 substitutes 30 [Mbps] for t (the application's 5G communication resource). In step 704, the application and network manager 503 orders the public MEC 102 to launch application H and proceeds to 705. In step 705, the application and network manager 503 orders the private MEC 105 to shut down application H and proceeds to 706. In step 706, the application and network manager 503 orders the client device 101 to switch its connectivity to public 5G and to apply the configuration for public MEC to the application H and it proceeds to 707. In step 707, the application and network manager updates T to 350 (=380−30) and proceeds to 702. In step 702, T=350 and V=350, so the output is No. The application and network manager 503 proceeds to 708.

Next, the process of application running in public MEC being migrated to private MEC is described. Here, the situation where application A, B, C, D, E, F, G. K are running in private MEC and application H and L are running in public MEC is assumed, then application G running in private MEC is shut down. In step 701, calculated total amount of the traffic in the private 5G network 103 as T is 320 [Mbps]. In step 702, T is 320 and v is 350, so the output is No and the application and network manager 503 proceeds to 708. In step 708, the application and network manager calculates margin s=30 (=350−320) and proceeds to step 709. In step 709, the resource of application Hand L running in public MEC is less than or equal to 30, so it proceeds to 710.

In step 710, as an example, application H running on the client device #10 is selected to be migrated to the private MEC from the public MEC. In this example, application H is selected because it requires more MEC computing resources per Mbps than application L. In this example, the 5G communication resource 30 [Mbps] of application H is substituted for u, then the flow proceeds to step 711 In step 711, the application and network manager 503 orders the private MEC to launch application L and proceeds to step 712. In step 712, the application and network manager 503 orders the public MEC to shut down application H and proceeds to step 713. In step 713, the application and network manager 503 orders the client device #10 to switch its connectivity to private 5G and to apply the configuration for private MEC to the application H and it proceeds to step 714. In step 714, the application and network manager updates T to 350 (=320+30) and proceeds to step 702.

Through the example implementations described herein, the client device notifies the system orchestrator such as the 5G system orchestrator of the state of the application which is transferrable or not as well as resource information as described herein. When the used traffic amount of the private network is over the predetermined value, the system orchestrator selects applications with the lowest value of MEC computing resource per Mbps among applications whose states are "transferrable."

FIG. 8 illustrates an example of the resource utilization table 502, in accordance with an example implementation. The table involves state of application 802 in addition to the items involved in FIG. 6 as illustrated herein. "Transferrable" means that the corresponding application is able to be transferred between the MECs safely and "Not transferrable" means that the corresponding application is not able to be transferred between the MECs safely.

When the application and network manager selects the applications to be migrated, it selects the application which has the lowest value of the MEC computing resource per Mbps among applications whose states are "transferrable". Here, it is assumed that the predetermined value for the traffic amount of the private network is 350 [Mbps] and the current traffic amount of the private network is 400 [Mbps], 50 [Mbps] (=400−350) of traffic on the private network needs to be migrated to the public network. The system orchestrator 106 selects an application with the lowest value of MEC computing resource per Mbps to be migrated among applications whose states are transferrable. In this case, the system orchestrator 106 selects application F to be migrated.

Through the example implementations described herein, necessary communication and computing resources can be prepared at lower cost under the IoT environment where different communication systems and different computing systems are applied. Further, safe migration of applications can be achieved without any negative effects on running applications.

Figure 9:
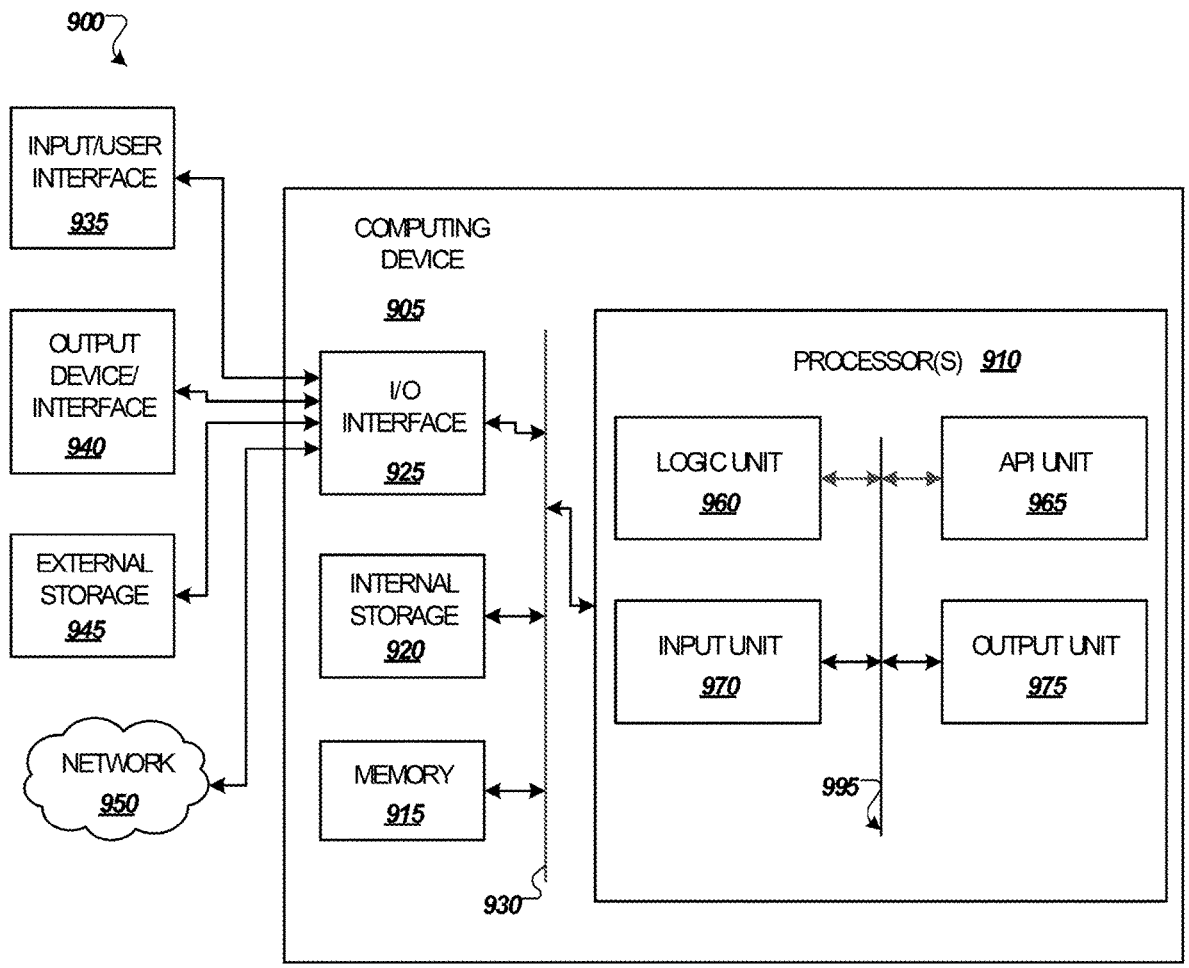
FIG. 9 illustrates an example computing environment with an example computer device suitable for use in some example implementations.

FIG. 9 illustrates an example computing environment with an example computer device suitable for use in some example implementations, such as a system orchestrator 106, client device 101, public MEC 104, or private MEC 105. Computer device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computer device 905. I/O interface 925 is also configured to receive images from cameras or provide images to projectors or displays, depending on the desired implementation.

Computer device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via I/O interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided. Processor(s) 910 can be in the form of hardware processors such as central processing units (CPUs) or in a combination of hardware and software units.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, input unit 970, output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide output based on the calculations described in example implementations.

Memory 915 can be configured to store instructions which are executed by processor(s) 910 as described below.

Processor(s) 910 can be configured to execute a method or computer instructions for managing communications between edge devices and cloud devices over a first network and a second network, which can involve monitoring an amount of traffic data in the first network; when the amount of traffic data exceeds a predetermined value, selecting one or more applications executing in a device of the first network; migrating the selected one or more applications from the first network to the second network; and changing a destination address of data communications associated with the selected one or more applications from the device in the first network to another device in the second network; wherein the selecting the one or more applications is conducted based on compute resources required for executing each one or more applications per traffic data. As described herein, the first network can be a private network (e.g., a private 5G network) and the second network can be a public network (e.g., a public 5G network).

Processor(s) 910 can be configured to execute a method or computer instructions wherein the selecting the one or more applications executing in the device of the first network involves excluding ones of the applications indicated as non-transferable from the selecting.

Processor(s) 910 can be configured to execute a method or computer instructions involving, for computer resources in the first network determined to be available for the migrated selected one or more applications, migrating the selected one or more applications from the second network to the first network. Depending on the desired implementation, the migrating the selected one or more applications from the second network to the first network can involve migrating ones of the selected one or more applications requiring the highest computer resources that is less than available computer resources in the first network as illustrated in step 710. In this manner, the applications requiring the highest resources that is less than the available resources in the first network can be migrated one by one to efficiently fill up the available resources in the first network.

In example implementations, the processor(s) 910 can be configured to execute a method or computer instructions as part of an implementation involving an orchestrator (e.g., a 5G orchestrator) as the computing device 905, wherein the orchestrator manages compute resources per traffic data and calculates the required compute resources per traffic data based on available computing resources and communication resources of the first network.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for managing communications between edge devices and cloud devices over a first network and a second network, comprising:
monitoring an amount of traffic data in the first network;
when the amount of traffic data exceeds a predetermined value:
selecting one or more applications executing in a device of the first network;
migrating the selected one or more applications from the first network to the second network; and
changing a destination address of data communications associated with the selected one or more applications from the device in the first network to another device in the second network;
wherein the selecting the one or more applications is conducted based on computer resources required for executing each one or more applications per traffic data,
wherein the selecting the one or more applications executing in the device of the first network comprises excluding ones of the applications indicated as non-transferrable from the selecting.

2. The method of claim 1, wherein the first network is a private network and the second network is a public network.

3. The method of claim 2, wherein the first network is a private 5G network.

4. The method of claim 1, further comprising:
for computer resources in the first network determined to be available for the migrated selected one or more applications, migrating the selected one or more applications back from the second network to the first network.

5. The method of claim 4, wherein the migrating the selected one or more applications from the second network to the first network comprises migrating ones of the selected one or more applications requiring highest computer resources that is less than available computer resources in the first network.

6. The method of claim 1, wherein the method is executed by an orchestrator that manages compute resources per traffic data and calculates the required compute resources per traffic data based on available computing resources and communication resources of the first network.

7. A non-transitory computer readable medium, storing instructions for managing communications between edge devices and cloud devices over a first network and a second network, the instructions comprising:
    monitoring an amount of traffic data in the first network;
    when the amount of traffic data exceeds a predetermined value:
        selecting one or more applications executing in a device of the first network;
        migrating the selected one or more applications from the first network to the second network; and
        changing a destination address of data communications associated with the selected one or more applications from the device in the first network to another device in the second network;
        wherein the selecting the one or more applications is conducted based on computer resources required for executing each one or more applications per traffic data,
        wherein the selecting the one or more applications executing in the device of the first network comprises excluding ones of the applications indicated as non-transferrable from the selecting.

8. The non-transitory computer readable medium of claim 7, wherein the first network is a private network and the second network is a public network.

9. The non-transitory computer readable medium of claim 8, wherein the first network is a private 5G network.

10. The non-transitory computer readable medium of claim 7, further comprising:
    for computer resources in the first network determined to be available for the migrated selected one or more applications, migrating the selected one or more applications back from the second network to the first network.

11. The non-transitory computer readable medium of claim 10, wherein the migrating the selected one or more applications from the second network to the first network comprises migrating ones of the selected one or more applications having computer resources requiring highest computer resources that is less than available computer resources in the first network.

12. The non-transitory computer readable medium of claim 7, wherein the instructions are executed by an orchestrator that manages compute resources per traffic data and calculates the required compute resources per traffic data based on available computing resources and communication resources of the first network.

13. An apparatus for managing communications between edge devices and cloud devices over a first network and a second network, the apparatus comprising:
    a memory configured to store instructions; and
    a processor, configured to execute the instructions stored in memory to execute a process comprising:
        monitoring an amount of traffic data in the first network;
        when the amount of traffic data exceeds a predetermined value:
        selecting one or more applications executing in a device of the first network;
        migrating the selected one or more applications from the first network to the second network; and
        changing a destination address of data communications associated with the selected one or more applications from the device in the first network to another device in the second network;
        wherein the selecting the one or more applications is conducted based on computer resources required for executing each one or more applications per traffic data,
        wherein the selecting the one or more applications executing in the device of the first network comprises excluding ones of the applications indicated as non-transferrable from the selecting.

\* \* \* \* \*